United States Patent
Fujita et al.

(10) Patent No.: US 10,604,593 B2
(45) Date of Patent: Mar. 31, 2020

(54) AQUEOUS EMULSION, ADHESIVE COMPOSITION, AND AQUEOUS EMULSION MANUFACTURING METHOD

(71) Applicant: 3M INNOVATIVE PROPERTIES COMPANY, St. Paul, MN (US)

(72) Inventors: Jun Fujita, Tokyo (JP); Takumi Kinoshita, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/517,538

(22) PCT Filed: Nov. 16, 2015

(86) PCT No.: PCT/US2015/060839
§ 371 (c)(1),
(2) Date: Apr. 7, 2017

(87) PCT Pub. No.: WO2016/081351
PCT Pub. Date: May 26, 2016

(65) Prior Publication Data
US 2017/0306060 A1  Oct. 26, 2017

(30) Foreign Application Priority Data
Nov. 18, 2014 (JP) .................. 2014-233402

(51) Int. Cl.
| | | |
|---|---|---|
| C08F 2/00 | (2006.01) |
| C08F 2/24 | (2006.01) |
| C08F 2/26 | (2006.01) |
| C08F 220/18 | (2006.01) |
| C08L 33/26 | (2006.01) |
| C09J 11/08 | (2006.01) |
| C09J 133/08 | (2006.01) |
| C09J 133/24 | (2006.01) |
| C09J 151/00 | (2006.01) |

(52) U.S. Cl.
CPC ................ *C08F 2/26* (2013.01); *C08F 2/001* (2013.01); *C08F 2/24* (2013.01); *C08F 220/18* (2013.01); *C08L 33/26* (2013.01); *C09J 11/08* (2013.01); *C09J 133/24* (2013.01); *C09J 151/003* (2013.01); *C08F 2220/1858* (2013.01); *C09J 133/08* (2013.01)

(58) Field of Classification Search
CPC .... C08F 2/26; C08F 2/001; C08F 2/24; C08F 220/18; C08F 2220/1858; C09J 151/003; C09J 133/24; C09J 11/08; C09J 133/08; C08L 33/26
See application file for complete search history.

(56) References Cited

U.S. PATENT DOCUMENTS

| | | | | |
|---|---|---|---|---|
| 4,425,469 A * | 1/1984 | Emmons | ................ | C08F 20/56 |
| | | | | 427/385.5 |
| 4,745,154 A * | 5/1988 | Ruffner | ................ | C08F 2/32 |
| | | | | 524/801 |
| 5,698,629 A | 12/1997 | Seki | | |
| 5,716,717 A * | 2/1998 | Yeung | ................ | D06N 7/0002 |
| | | | | 428/511 |
| 2013/0231429 A1* | 9/2013 | Sexton | ................ | C08K 5/09 |
| | | | | 524/322 |
| 2015/0064489 A1 | 3/2015 | Qie et al. | | |

FOREIGN PATENT DOCUMENTS

| | | |
|---|---|---|
| GB | 2 294 466 | 5/1996 |
| JP | H07-166031 | 6/1995 |
| WO | WO 2005/090503 | 9/2005 |
| WO | WO 2013/149101 | * 10/2013 |

OTHER PUBLICATIONS

SEPPIC Performance Materials, Product Portfolio Ingredients that inspire, Aug. 8, 2014, 40 pages.
PCT International Search Report from PCT/US2015/060839; dated Jan. 28, 2016, 4 pages.

* cited by examiner

*Primary Examiner* — Patrick D Niland
(74) *Attorney, Agent, or Firm* — Steven A. Bern; Philip Y. Dahl

(57) ABSTRACT

There is provided an aqueous emulsion derived from a blend comprising an acrylic polymer, wherein the pH of the dispersion medium is less than 7.0, and a water-in-oil emulsion containing a nonionic water-soluble polymer, which aqueous emulsion has viscosity of 1,000 to 15,000 mPa s at 25° C. There are also provided adhesive compositions made using the aqueous emulsion and methods for manufacturing the aqueous emulsion.

16 Claims, No Drawings

AQUEOUS EMULSION, ADHESIVE COMPOSITION, AND AQUEOUS EMULSION MANUFACTURING METHOD

TECHNICAL FIELD

The present disclosure relates to an aqueous emulsion, an adhesive composition, and an aqueous emulsion manufacturing method.

BACKGROUND ART

Aqueous emulsions containing adhesive polymers have long been used as adhesive compositions. For example, a one-part curable adhesive composition is described in Patent Document 1 (Japanese Unexamined Patent Application No. H07-166031) that is made by combining an epoxy resin curing agent with an epoxy-modified acrylic emulsion.

Additionally, Patent Document 2 (International Unexamined Patent Application No. 2013/149101) discloses the use of a specific acrylic emulsion kept under acidic conditions as an adhesive composition.

SUMMARY

The present disclosure provides an aqueous emulsion that can be appropriately used as an adhesive composition, has appropriate viscosity for roll coating, and has an excellent rate of adhesive layer formation. Another objective of the present disclosure is to provide an adhesive composition that contains the aqueous emulsion, and a method of manufacturing the aqueous emulsion.

An aspect of the present disclosure relates to an aqueous emulsion formed by blending an oil-in-water emulsion containing an acrylic polymer, in which the pH of the dispersion medium is less than 7.0, with a water-in-oil emulsion containing a nonionic water-soluble polymer, in which the aqueous emulsion has viscosity of 1,000 to 15,000 mPa·s at 25° C.

Another aspect of the present disclosure relates to an adhesive composition that contains the aqueous emulsion.

A further aspect of the present disclosure relates to a method of manufacturing the aqueous emulsion described above, wherein the manufacturing method comprises a blending step that blends the oil-in-water emulsion containing an acrylic polymer, in which the pH of the dispersion medium is less than 7.0, with the water-in-oil emulsion containing a nonionic water-soluble polymer.

In some embodiments, the manufacturing method can implement the blending step by adding the water-in-oil emulsion to the oil-in-water emulsion.

In some embodiments, the manufacturing method can implement the blending step by adding the oil-in-water emulsion to the water-in-oil emulsion.

The present disclosure is able to provide an aqueous emulsion that can be appropriately used as an adhesive composition, has appropriate viscosity for roll coating, and has an excellent rate of adhesive layer formation. The present disclosure also is able to provide an adhesive composition that contains the aqueous emulsion, and a method of manufacturing the aqueous emulsion.

DETAILED DESCRIPTION

A presently disclosed aqueous emulsion is derived from a blend comprising an acrylic polymer, wherein the pH of the dispersion medium is less than 7.0, and a water-in-oil emulsion containing a nonionic water-soluble polymer. The aqueous emulsion of some embodiments also has viscosity of 1,000 to 15,000 mPa·s at 25° C.

The aqueous emulsion of some embodiments may be used as an adhesive composition because the acrylic polymer effectively functions as an adhesive. Specifically, an adhesive layer containing the acrylic polymer can easily be formed by applying the aqueous emulsion to a substrate.

In some embodiments, the pH of the oil-in-water emulsion that contains an acrylic polymer is less than 7.0. In such an oil-in-water emulsion, the acrylic polymer easily aggregates and rapidly forms an adhesive layer after being applied to the substrate. On the other hand, while the oil-in-water emulsion has low viscosity and is suitable for spray application uses, it does not lend itself to forming thick adhesion layers by roll coating, and the like.

In some embodiments, a water-in-oil emulsion that contains a nonionic water-soluble polymer functions as a thickening agent for the oil-in-water emulsion. Because the oil-in-water emulsion is in an acidic condition (pH less than 7.0), the acrylic polymer aggregates easily and, in cases where a normal thickening agent (e.g., a thickening agent made from an emulsion containing a cationic polymer) was used, the acrylic polymer would aggregate when blended so that a uniform emulsion is not obtained. In contrast, in some embodiments, using a water-in-oil emulsion containing a nonionic water-soluble polymer makes it possible to suppress coagulation in the acrylic polymer emulsion and to provide a viscosity suitable for application methods such as roll coating (1,000 to 15,000 mPa at 25° C.).

That is to say, the emulsion of some embodiments features rapid formation of an adhesive layer derived from the oil-in-water emulsion, and possesses a viscosity suitable for application methods such as roll coating, whereby high thickness adhesive layers can be easily formed.

The oil-in-water emulsion is an emulsion in which the dispersion medium contains water and the dispersoid contains an acrylic polymer. The dispersoid may contain one type of acrylic polymer or it may contain two or more types of acrylic polymers.

The oil-in-water emulsion preferably is an emulsion in which resin particles containing acrylic polymer are dispersed in a dispersion medium containing water.

In some embodiments, the acrylic polymer is water-insoluble, is adhesive, and is able to form an adhesive layer. The acrylic polymer is a polymer in which the content of monomer units derived from a (meth)acryloyl group-containing monomer exceeds 50% by mass.

Examples of acrylic polymers include polymers obtained by polymerization of one, two, or more acrylic monomers ((meth)acryloyl-containing monomers). The acrylic polymer may also be a copolymer of an acrylic monomer and another monomer possessing an unsaturated double bond.

Examples of acrylic monomers include alkyl (meth)acrylates such as methyl (meth)acrylate, ethyl (meth)acrylate, butyl (meth)acrylate, 2-ethylhexyl (meth)acrylate, isooctyl (meth)acrylate, lauryl (meth)acrylate, and alicyclic (meth)acrylates (e.g., isobornyl (meth)acrylate); substituted alkyl (meth)acrylates such as phenoxyethyl (meth)acrylate; and acrylamides such as acrylamide and N,N-dimethyl acrylamide.

Additionally, examples of other monomers with an unsaturated double bond include styrene, vinyl acetate, and N-vinyl pyrrolidone.

Furthermore, copolymerizing monomers possessing polar groups in the acrylic polymer allow for the emulsion to be stabilized, and make crosslinking possible when dry.

Examples of monomers with polar groups include monomers with carboxyl groups such as (meth)acrylic acid and acrylic acid dimers; monomers with hydroxyl groups such as hydroxyethyl (meth)acrylate and hydroxybutyl (meth)acrylate; and monomers with carbonyl groups such as diacetone (meth)acrylamide, acryloyl benzophenone, and acrolein.

By preparing the acrylic polymer to be cross-linkable, crosslinking can occur during formation of the adhesive layer and the cohesive force of the adhesive layer can be improved. In particular, when the acrylic polymer is prepared by copolymerizing monomers possessing carbonyl groups, crosslinking is made possible by polyhydrazides, as described below. Using this kind of acrylic polymer, while being inert (un-crosslinked) in the aqueous emulsion, eliminates moisture during layer formation, making it possible to rapidly form crosslinks.

The resin particles may represent resin particles made from one type of acrylic polymer for example, and may also be resin particles that contain two or more types of acrylic polymers. For example, the resin particles may be core-shell type resin particles.

The mean particle size of the resin particles preferably is not less than 0.01 µm and not more than 100 µm, and more preferably is not less than 0.1 µm and not more than 10 µm. There is a tendency for the stability of the emulsion to be improved as a result of the mean particle size of resin particles being made to lie within the above range. Further, the mean particle size of the resin particles represents the value measured in compliance with Japanese Industrial Standard (JIS) Z 8825:2013.

The method of polymerizing the acrylic polymer in the oil-in-water emulsion is not specifically limited, and may be one in which an acrylic polymer is synthesized by emulsion polymerization, or synthesized by suspension polymerization for example.

The content of acrylic polymer in the oil-in-water emulsion preferably is not less than 30% by mass, and more preferably not less than 40% by mass, versus the total quantity of oil-in-water emulsion. Having the acrylic polymer content within the above range further improves the rate of layer formation of the aqueous emulsion, and makes it possible to form adhesive layers of even greater thickness. Additionally, the content of acrylic polymer in the oil-in-water emulsion preferably is not more than 70% by mass, and more preferably not more than 60% by mass. Conforming to such a content allows for stabilization of the emulsion.

The weight-average molecular weight of the acrylic polymer preferably is not less than 5,000, and more preferably not less than 50,000. The acrylic polymer having a high weight-average molecular weight can further improve the cohesive force of the adhesive layer that is formed. Further, the cohesive force of the adhesive layer that is formed can also be improved, even when the weight-average molecular weight of the acrylic polymer is low, by adding crosslinking agents, and the like.

The glass transition temperature Tg of the acrylic polymer may be −70 to 100° C. for example. The glass transition temperature Tg of the acrylic polymer may be appropriately modified according to the application of the aqueous emulsion. For example, in a case where the aqueous emulsion is applied and dried at room temperature to form an adhesive layer, it is preferable from the perspective of improving film formation properties for the glass transition temperature Tg to be not more than 40° C., and more preferably not more than 30° C. If the Tg of the acrylic polymer exceeds 40° C., it becomes necessary to use a film formation aid or to force drying with a thermal oven, or the like. Additionally, when the adhesive layer formed from the aqueous emulsion is used as a pressure sensitive adhesive (tackifier), it is preferable for the glass transition temperature of the acrylic polymer to be −70 to 0° C., and more preferably −40 to −10° C.

Additionally, when the acrylic polymer is a core-shell type resin particle, it is preferable that the glass transition temperature $Tg_1$ of the acrylic polymer that forms the shell is lower than the glass transition temperature $Tg_2$ of the acrylic polymer that forms the core. Such a resin particle tends to make it easier for the acrylic polymer that forms the shell to soften during film formation, making film formation easier.

The oil-in-water emulsion may also further contain ingredients other than acrylic polymer. For example, when the acrylic polymer is prepared to be cross-linkable, the cohesive force can be improved by crosslinking the acrylic polymer through the admixture of a crosslinking agent.

The crosslinking agent can be appropriately selected according to the function group in the acrylic polymer. Examples of crosslinking agents include polyisocyanate, polyaziridine, polyglycidyl ether, and polyhydrazide. For example, in a case where the acrylic polymer has a carbonyl group, it is preferable to use polyhydrazide as the crosslinking agent. Using polyhydrazide as the crosslinking agent does not promote a crosslinking reaction in the aqueous emulsion, but rapidly forms crosslinks at the moisture elimination stage during layer formation. Therefore, using polyhydrazide as the crosslinking agent can provide both stability for the aqueous emulsion and superior layer formation properties.

Additionally, the oil-in-water emulsion may further contain latex, synthetic rubber, or the like to control the properties of the adhesive layer. The oil-in-water emulsion may further also contain pigments, anti-aging materials, surface conditioners, preservatives, film formation adjuvants, and the like. These ingredients may be dissolved in the dispersion medium, and may also be contained in the dispersoid.

The pH of the oil-in-water emulsion is less than 7.0, preferably 4.0 to 6.8, and more preferably 4.5 to 6.5. The pH of the oil-in-water emulsion can be adjusted with a pH regulating agent such as sodium dihydrogen phosphate, potassium dihydrogen phosphate, sodium hydrogen phosphate, potassium hydrogen phosphate, sodium phosphate, and potassium phosphate.

The water-in-oil emulsion is an emulsion in which the dispersion medium contains an organic solvent and the dispersoid contains a nonionic water-soluble polymer. The dispersoid may contain one type of nonionic water-soluble polymer or it may contain two or more types of nonionic water-soluble polymers.

The nonionic water-soluble polymer in this embodiment is a polymer that is nonionic and water-soluble, and may be able to form an emulsion when dispersed in a dispersion medium that contains an organic solvent. The nonionic water-soluble polymer dissolves in the dispersion medium in the aqueous emulsion, thickening the aqueous emulsion.

Examples of nonionic water-soluble polymers include acrylamide polymer, polyvinyl alcohol, polyethylene glycol, hydroxyalkyl cellulose, and starch, of which acrylamide polymers are particularly well suited for use.

Acrylamide polymers are polymers in which the content of monomer units derived from acrylamide monomers exceeds 50% by mass. Acrylamide monomers are monomers that possess a (meth)acrylamide or substitution group on the nitrogen atom thereof, examples of which include (meth)

acrylamide, N-alkyl acrylamide, N,N-dialkyl acrylamide, N-hydroxyalkyl acrylamide, and diacetone acrylamide.

The acrylamide polymer may be a copolymer of an acrylamide monomer and another monomer, wherein the other monomer may be, e.g., a vinyl amide monomer such as vinyl acetoamide or N-vinyl pyrrolidone; an acrylic monomer possessing a hydroxyl group such as hydroxyalkyl (meth)acrylate or polyoxyethylene (meth)acrylate; and water-soluble monomers such as vinyl alcohol and allyl alcohol.

The method of manufacturing the water-in-oil emulsion is not specifically limited, and examples thereof include a method wherein an aqueous solution of nonionic water-soluble polymer is emulsified in an oil phase to which a surfactant has been added, a production method by reverse-phase emulsion polymerization, and a production method by reverse-phase suspension polymerization.

The water-in-oil emulsion preferably is an emulsion in which water-soluble resin particles containing a nonionic water-soluble polymer are diffused in a diffusion medium containing an organic solvent.

The water-soluble resin particles may represent resin particles made from one or more types of nonionic water-soluble polymers, and may also be resin particles that contain two or more types of nonionic water-soluble polymers for example.

The content of nonionic water-soluble polymer in the water-in-oil emulsion preferably is not less than 5% by mass, more preferably not less than 10% by mass, and may also be not less than 20% by mass, versus the total quantity of water-in-oil emulsion. The content of nonionic water-soluble polymer in the water-in-oil emulsion preferably also is not more than 80% by mass, more preferably not more than 70% by mass, versus the total quantity of water-in-oil emulsion. A water-in-oil emulsion with a nonionic water-soluble polymer content within the above range is easily manufactured and has sufficiently good thickening effect.

The weight-average molecular weight of the nonionic water-soluble polymer preferably is not less than $1.0 \times 10^5$, more preferably not less than $1.0 \times 10^6$. The weight-average molecular weight of the nonionic water-soluble polymer is also preferably not more than $1.0 \times 10^9$, and more preferably not more than $1.0 \times 10^8$ for example.

The dispersion medium of the water-in-oil emulsion contains a water-incompatible organic solvent. The organic solvent may be one in which the nonionic water-soluble polymer is dispersible as a dispersion medium, examples of which include paraffins, isoparaffins, poly-α-olefin, polyisobutylene, naphthenes, aliphatic esters, aliphatic alcohols, aliphatic ethers, silicones, and aromatic compounds.

The water-in-oil emulsion may contain one, two, or more types of organic solvents. Isoparaffins also can be appropriately used as the organic solvent.

The water-in-oil emulsion may further also contain ingredients other than a nonionic water-soluble polymer. For example, the water-in-oil emulsion may further also contain pigments, anti-aging materials, surface conditioners, preservatives, crosslinking agents, and the like. These ingredients may be dissolved in the dispersion medium, and may also be contained in the dispersoid.

The aqueous emulsion is an emulsion made by blending the oil-in-water emulsion and the water-in-oil emulsion. The aqueous emulsion can be an emulsion in which the dispersion medium contains water and a nonionic water-soluble polymer and the dispersoid contains an acrylic polymer.

The acrylic polymer content in the aqueous emulsion preferably is not less than 25% by mass, more preferably not less than 35% by mass, versus the total quantity of aqueous emulsion. Having an acrylic polymer content in the aforementioned range can improve the layer formation speed and makes it possible to form even thicker adhesive layers. Further, the layer formation speed indicates the speed after the aqueous emulsion is applied until the formed film expresses cohesive force. The acrylic polymer content in the aqueous emulsion also preferably is not more than 60% by mass, more preferably not more than 70%. Conforming to such a content allows for stabilization of the emulsion.

The viscosity of the aqueous emulsion at 25° C. is 1,000 to 15,000 mPa·s. The viscosity of the aqueous emulsion being in the above range makes it so that the aqueous emulsion can be appropriately used in application methods such as roll coating, and makes it possible to easily form thick adhesive layers. Additionally, the viscosity of the aqueous emulsion at 25° C. preferably is also not less than 1,500 mPa·s. The viscosity of the aqueous emulsion at 25° C. preferably is also not more than 10,000 mPa·s. Further, the viscosity of the aqueous emulsion in this Specification is measured according to Japanese Industrial Standard (JIS) Z 8803:2011.

The viscosity of the aqueous emulsion can be appropriately adjusted by the average molecular weight and the content of the nonionic water-soluble polymer.

The content of nonionic water-soluble polymer in the aqueous emulsion can be appropriately adjusted to yield the preferred viscosity range, but may be not less than 0.001% by mass, preferably not less than 0.01% by mass, and more preferably not less than 0.1% by mass, versus the total quantity of aqueous emulsion for example. The content of nonionic water-soluble polymer in the aqueous emulsion also is not more than 20% by mass, preferably 10% by mass, and more preferably 5% by mass for example.

The blending proportions of oil-in-water emulsion and water-in-oil emulsion can be appropriately adjusted to fulfill the suitable content ranges. For example, the ratio $C_2/C_1$ of the mixture quantity of water-in-oil emulsion $C_2$ to the mixture quantity of oil-in-water emulsion $C_1$ can be 0.001 to 0.1, and can be 0.005 to 0.5.

The pH of the aqueous emulsion may be less than 7.0, and preferably is 4.0 to 6.8, more preferably 4.5 to 6.5.

The aqueous emulsion can be manufactured by a manufacturing method that comprises a blending step that blends an oil-in-water emulsion containing with a water-in-oil emulsion containing a nonionic water-soluble polymer.

Here, in the blending step, a water-in-oil emulsion may be added to an oil-in-water emulsion, or an oil-in-water emulsion may be added to a water-in-oil emulsion.

As described above, the oil-in-water emulsion is in an acidic condition, putting the acrylic polymer is in an easily aggregated state. Therefore, a method is preferred in the blending step in which the water-in-oil emulsion is added to the oil-in-water emulsion, or the oil-in-water emulsion is added to the water-in-oil emulsion, and the two are slowly blended.

Additionally, in this embodiment, the aqueous emulsion can be obtained by adding water to a water-in-oil emulsion to cause the phase to change to oil-in-water, and then adding an oil-in-water emulsion. This kind of method can more markedly control coagulation in the emulsion.

The foregoing has described a preferable embodiment of the present disclosure, although the present disclosure is in no way limited to the above embodiment.

Following are some non-limiting, exemplary embodiments of the present disclosure:

Embodiment 1. An aqueous emulsion derived from a blend comprising:
(a) an acrylic polymer, wherein the pH of the dispersion medium is less than 7.0, and
(b) a water-in-oil emulsion containing a nonionic water-soluble polymer, which aqueous emulsion has viscosity of 1,000 to 15,000 mPa·s at 25° C.

Embodiment 2. An adhesive composition that contains the aqueous emulsion according to Embodiment 1.

Embodiment 3. A method of manufacturing the aqueous emulsion according to Embodiment 1, wherein the manufacturing method comprises a blending step in which the oil-in-water emulsion containing an acrylic polymer, in which the pH of the dispersion medium is less than 7.0, is blended with the water-in-oil emulsion containing a nonionic water-soluble polymer.

Embodiment 4. The manufacturing method according to Embodiment 3, wherein the water-in-oil emulsion is added to the oil-in-water emulsion during the blending step.

Embodiment 5. The manufacturing method according to Embodiment 3, wherein the oil-in-water emulsion is added to the water-in-oil emulsion during the blending step.

EXAMPLES

The present disclosure will be more concretely described below by way of examples, but the present disclosure is in no way limited by the following examples.

Synthesis Example 1

Preparation of Oil-in-water Emulsion A1

The oil-in-water emulsion A1 was prepared according to example 3 in International Unexamined Patent Application No 2013/149101, and was prepared by the following method.

A mixture of 0.39 parts by mass sodium dodecylbenzene sulfonate (DBS) anionic surfactant, 0.0003 parts by mass sodium hydrogen carbonate, 0.07 parts by mass ferrous sulfate heptahydrate, 13.76 parts by mass 2-ethylhexyl acrylate (2-EHA), 9.17 parts by mass isobornyl acrylate (IBXA), 5.73 parts by mass methyl acrylate (MA), and 38.70 parts by mass deionized water was stirred and heated in a nitrogen atmosphere in a 5-mouthed reaction flask equipped with a recirculation cooler, temperature probe, mechanical stirrer, constant volume pump, and supply funnel. After the mixture temperature reached 50° C., a solution consisting of 0.08 parts by mass ammonium persulfate, 0.03 parts by mass sodium pyrosulfate, and 0.88 parts by mass deionized water was added to the flask. After addition, the reaction solution was held at a temperature of 50° C. for 10 minutes, and then made exothermic by heating to 60° C., and further held for 15 minutes at a temperature of 78° C.

Next, an initiator solution containing 0.03 parts by mass deionized water and 1.10 parts by mass potassium persulfate was added at once and mixed for 2 minutes, after which, a pre-emulsion made from 0.06 parts by weight sodium dodecylbenzene sulfonate (DBS) anionic surfactant, 13.38 parts by mass butyl acrylate (BA), 5.36 parts by mass methyl methacrylate (MMA), 0.80 parts by mass methacrylic acid (MAA), and 0.20 parts by mass diacetone acrylamide (DAAM) was supplied to the reactor over 70 minutes using a precision pump. After supplying the pre-emulsion, the system was heated for 40 minutes at 78° C.

Next, 0.33 parts by weight of an aqueous solution of t-butyl hydroperoxide initiator (8.48% by mass) and 0.21 parts by mass of an aqueous solution of sodium formaldehyde sulfoxylate hydride initiator (4.76% by mass) were added at once. This was then stirred for 15 minutes at 78° C., and blending/heating was continued for another 15 minutes. An ice bath was used to rapidly cool the resulting emulsion to 25° C., 0.01 parts by mass hydroquinone control agent was added and dissolved, and the emulsion was filtered through a cheesecloth.

When the dry weight of the resulting emulsion was measured, the solids content was 48% by mass. The monomer conversion rate measured by gas chromatography was 99.6%.

Then, 0.9 parts by mass of a 10% by mass aqueous solution of adipic acid dihydrazide (ADH) was added to 50 parts by mass of the emulsion obtained above. Furthermore, 0.04 parts by mass Proxel BD20 (20% aqueous dispersion of 1,2-benzothiazoline-3-one) was added while stirring this emulsion, yielding oil-in-water emulsion A1, which contains a core-shell acrylic polymer. The pH of the resulting oil-in-water emulsion was 5.7, and the viscosity at 25° C. was 440 mPa·s.

Synthesis Example 2

Preparation of Oil-in-water Emulsion A2

To ion exchanged water, 6.67 parts by mass sodium dodecylbenzene sulfonate (DBS) anionic surfactant and 1.5 parts by mass potassium dihydrogen phosphate dihydrate were added to make 125 parts by mass. A monomer composition of 73 parts by mass 2-ethylhexyl acrylate (2-EHA), 25 parts by mass octadecyl acrylate (ODA), and 2.0 parts by mass diacetone acrylamide (DAAM) were then added to this aqueous solution. This mixture was processed for 15 minutes in a homogenizer (manufactured by Primix Corp.). The mixture was then transferred to a 2-liter glass reaction vessel equipped with a stirrer, cooler, and nitrogen introduction tube and, after purging the nitrogen, heated to an internal temperature of 50° C. while stirring. A polymerization reaction was then started by adding 0.2 parts by mass azobis-valeronitrile as a polymerization initiator, and after reacting for 3 hours, the system was cured for 2 hours at 65° C. and polymerization was completed.

As a result of polymerization, a pH 6.5 suspension was obtained that contained virtually no aggregates. 0.5 parts by mass of a 10% aqueous solution of adipic acid dihydride (ADH) as crosslinking agent and 0.2 parts by mass Proxel BD20 (20% aqueous dispersion of 1,2-benzothiazoline-3-one, manufactured by Arch Chemicals Japan, Minato-ku, Tokyo) as a preservative were added to this liquid while stirring, yielding the oil-in-water emulsion A2. The viscosity at 25° C. of the resulting oil-in-water emulsion A2 was 350 mPa·s.

Example 1

In a 50-mL glass bottle, 40 g of the oil-in-water emulsion A1 prepared in synthesis example 1 was weighed, and then 1.0 g of a nonionic water-in-oil emulsion thickening agent (Senka Actgel NS100, polyacrylamide, 35% solids, manufactured by Senka Corp., Tsurumi-ku, Osaka) was dripped over 30 seconds while stirring. The product was then stirred for 2 minutes at 2,000 rpm using a rotation/revolution type mixer to yield an aqueous emulsion. The viscosity at 25° C. of the resulting aqueous emulsion was 4,460 mPa·s, and pH was 5.7. The resulting aqueous emulsion was also subjected to the following stability test and adhesive layer forming properties test.

<Stability Test>

Samples of the aqueous emulsion left at 25° C. for 10 days and 95 days were stirred for 10 minutes at 2,000 rpm using a rotation/revolution type mixer, and then observed for the presence of aggregates and the viscosity (at 25° C.) was measured.

<Adhesive Layer Forming Properties Test>

On one end of a piece of neutral paper cut into strips, 0.1 g of the aqueous emulsion was dripped and then a piece of neutral paper was pressed thereupon. After 5 seconds, the neutral paper was pulled off and if the neutral paper tore an A evaluation, indicating excellent fast adhesive layer forming properties, was given, while a B evaluation was given if the paper did not tear.

As the result of the above tests on the aqueous emulsion obtained in Example 1, no aggregates were observed in either the sample left for 10 days or the sample left for 95 days. Additionally, the viscosity of the sample left for 10 days was 4,900 mPa·s and the viscosity of the sample left for 95 days was 5,040 mPa·s, indicating virtually no change. Also, the adhesive layer forming properties test evaluations were A.

Example 2

Other than changing the amount of thickener added to 0.8 g, an aqueous emulsion was prepared in the same manner as in example 1. The viscosity of the resulting aqueous emulsion at 25° C. was 3,320 mPa·s and the pH was 5.7. Additionally, the evaluation result was an A when the adhesive layer forming properties of the resulting aqueous emulsion were tested in the same manner as in example 1.

Example 3

Other than using the oil-in-water emulsion A2 prepared in synthesis example 2 instead of oil-in-water emulsion A1, an aqueous emulsion was prepared in the same manner as in example 1. The viscosity of the resulting aqueous emulsion at 25° C. was 1,620 mPa·s and the pH was 6.5. Additionally, the evaluation result was an A when the adhesive layer forming properties of the resulting aqueous emulsion were tested in the same manner as in example 1.

Comparative Example 1

Other than using 0.8 g of a cationic thickener (Senka Actgel CM 200, acrylic copolymer, 35% solids, manufactured by Senka Corp., Tsurumi-ku, Osaka) as a thickener, an aqueous emulsion was prepared in the same manner as in example 1. The resulting aqueous emulsion contained acrylic polymer aggregate, could not form a uniform adhesive layer, and was difficult to use as an adhesive composition.

Comparative Example 2

Other than using 0.8 g of a cationic thickener (Senka Actgel CD 200, acrylic copolymer, 40% solids, manufactured by Senka Corp., Tsurumi-ku, Osaka) as a thickener, an aqueous emulsion was prepared in the same manner as in example 1. The resulting aqueous emulsion contained acrylic polymer aggregate, could not form a uniform adhesive layer, and was difficult to use as an adhesive composition.

Comparative Example 3

Other than using 0.8 g of a cationic thickener (Cosquat GA 468, acrylic copolymer powder, manufactured by Osaka Organic Chemical Industry Ltd., Chuo-ku, Osaka) as a thickener, an aqueous emulsion was prepared in the same manner as in example 1. The resulting aqueous emulsion contained acrylic polymer aggregate, could not form a uniform adhesive layer, and was difficult to use as an adhesive composition.

Comparative Example 4

Other than using 0.8 g of an anionic thickener (Carbopol EZ-3, acrylic acid copolymer powder, manufactured by Lubrizol Japan Ltd., Meguro-ku, Tokyo) as a thickener, an aqueous emulsion was prepared in the same manner as in example 1. The resulting aqueous emulsion contained acrylic polymer aggregate, could not form a uniform adhesive layer, and was difficult to use as an adhesive composition.

Comparative Example 5

Other than using 0.8 g of an oil-in-water emulsion nonionic thickener (A-S-A ER-30, polyurethane dispersion, 20% solids, manufactured by Itoh Oil Chemicals Co., Ltd., Yokkaichi, Mie Prefecture) as a thickener, an aqueous emulsion was prepared in the same manner as in example 1. The nonionic thickener was incompatible with the resulting aqueous emulsion, and no increase in viscosity was observed.

Comparative Example 6

Other than using 0.8 g of an oil-in-water emulsion nonionic thickener (A-S-A ER-90, polyurethane dispersion, 30% solids, manufactured by Itoh Oil Chemicals Co., Ltd., Yokkaichi, Mie Prefecture) as a thickener, an aqueous emulsion was prepared in the same manner as in example 1. The nonionic thickener was incompatible with the resulting aqueous emulsion, and no increase in viscosity was observed.

Comparative Example 7

Other than using 0.8 g of a powdered nonionic thickener (Accofloc N-104, polyacrylamide powder, manufactured by MT Aquapolymer, Inc., Chiyoda-ku, Tokyo) as a thickener, an aqueous emulsion was prepared in the same manner as in example 1. The resulting aqueous emulsion contained undissolved thickener powder residue and acrylic polymer aggregate, could not form a uniform adhesive layer, and was difficult to use as an adhesive composition.

Example 4

In a 50-mL sample bottle, 30 g of a water-in-oil emulsion nonionic thickener (Solagum SH210, acrylamide polymer, manufactured by Seppic, Paris, France) was weighed, and then 3.7 g of ion exchanged water was added. When stirred for 1 minute at 2,000 rpm using a rotation/revolution type mixer, the phase changed to oil-in-water, forming a gel. The oil-in-water emulsion Al prepared in synthesis example 1 was then added and stirred for 2 minutes at 2,000 rpm using a rotation/revolution type mixer to yield an aqueous emulsion. The resulting aqueous emulsion contained no aggregates, had viscosity at 25° C. of 3,600 mPa·s, and the pH was 5.7. Additionally, the evaluation result was an A when the adhesive layer forming properties of the resulting aqueous emulsion were tested in the same manner as in example 1.

Example 5

Other than using 0.3 g of a water-in-oil emulsion nonionic thickener (Solagum USPI, acrylamide polymer, manufactured by Seppic, Paris, France) as a thickener, an aqueous emulsion was prepared in the same manner as in example 4. The resulting aqueous emulsion contained no aggregates, had viscosity at 25° C. of 1,780 mPa·s, and the pH was 5.7. Additionally, the evaluation result was an A when the adhesive layer forming properties of the resulting aqueous emulsion were tested in the same manner as in example 1.

Example 6

Other than using 1.0 g of a water-in-oil emulsion nonionic thickener (Senka Actgel NS100, polyacrylamide, 35% solids, manufactured by Senka Corp., Tsurumi-ku, Osaka) as a thickener, an aqueous emulsion was prepared in the same manner as in example 4. The resulting aqueous emulsion contained no aggregates, had viscosity at 25° C. of 3,080 mPa·s, and the pH was 5.7. Additionally, the evaluation result was an A when the adhesive layer forming properties of the resulting aqueous emulsion were tested in the same manner as in example 1.

Example 7

Other than using a the oil-in-water emulsion A2 prepared in synthesis example 2 in addition to oil-in-water emulsion A1, an aqueous emulsion was prepared in the same manner as in example 4. The resulting aqueous emulsion contained no aggregates, had viscosity at 25° C. of 1,980 mPa·s, and the pH was 6.5. Additionally, the evaluation result was an A when the adhesive layer forming properties of the resulting aqueous emulsion were tested in the same manner as in example 1.

Comparative Example 8

Other than using 0.8 g of a cationic thickener (Senka Actgel CM 200, acrylic copolymer, 35% solids, manufactured by Senka Corp., Tsurumi-ku, Osaka) as a thickener, an aqueous emulsion was prepared in the same manner as in example 1. The resulting aqueous emulsion contained acrylic polymer aggregate, could not form a uniform adhesive layer, and was difficult to use as an adhesive composition.

Comparative Example 9

In a 50-mL glass bottle, 40 g of oil-in-water emulsion Al prepared in synthesis example 1 was weighed, and then 0.10 g of an alkaline type thickener (Primal TT-615, oil-in-water emulsion, acrylic acid copolymer, Dow Chemical Japan Ltd., Shinagawa-ku, Tokyo) was dripped in while stirring with a mechanical stirrer. Next, 0.10 g of 29% by weight concentration ammonia water was added and stirred for 2 minutes at 2,000 rpm using a rotation/revolution type mixer to yield an aqueous emulsion.

The resulting aqueous emulsion had viscosity at 25° C. of 2,900 mPa·s and pH of 8.2. The evaluation result was an B when the adhesive layer forming properties of the resulting aqueous emulsion were tested as described above, revealing inferior adhesive layer forming properties compared with those of the aqueous emulsions of examples.

Comparative Example 10

Other than changing the amount of thickener added to 0.15 g, an aqueous emulsion was prepared in the same manner as in comparative example 9. The resulting aqueous emulsion had viscosity at 25° C. of 7,520 mPa·s and pH of 8.1. The evaluation result was an B when the adhesive layer forming properties of the resulting aqueous emulsion were tested as described above, revealing inferior adhesive layer forming properties compared with those of the aqueous emulsions of the examples.

What is claimed is:

1. An aqueous emulsion derived from a blend comprising:
    (a) an oil-in-water emulsion comprising an acrylic polymer in a dispersion medium, wherein the dispersion medium has a pH of 4.5 to 6.5, and
    (b) a water-in-oil emulsion comprising a nonionic water-soluble polymer, wherein the aqueous emulsion has viscosity of 1,000 to 15,000 mPa·s at 25° C.;
    wherein the acrylic polymer is a polymer in which the content of monomer units derived from (meth)acryloyl group-containing monomers exceeds 50% by mass; and
    wherein the acrylic polymer comprises monomer units derived from alicyclic (meth)acrylate monomers.

2. An adhesive composition comprising the aqueous emulsion according to claim 1.

3. A method of manufacturing the aqueous emulsion according to claim 1, wherein the manufacturing method comprises a blending step in which the oil-in-water emulsion comprising an acrylic polymer in a dispersion medium is blended with the water-in-oil emulsion comprising a nonionic water-soluble polymer.

4. The manufacturing method according to claim 3, wherein the water-in-oil emulsion is added to the oil-in-water emulsion during the blending step.

5. The manufacturing method according to claim 3, wherein the oil-in-water emulsion is added to the water-in-oil emulsion during the blending step.

6. The aqueous emulsion of claim 1 wherein the acrylic polymer is obtained by polymerization of two or more acrylic monomers.

7. The adhesive composition of claim 2 wherein the acrylic polymer is obtained by polymerization of two or more acrylic monomers.

8. The aqueous emulsion of claim 1 wherein the acrylic polymer is obtained by polymerization of three or more acrylic monomers.

9. The adhesive composition of claim 2 wherein the acrylic polymer is obtained by polymerization of three or more acrylic monomers.

10. The aqueous emulsion of claim 1 wherein the acrylic polymer is a core-shell resin particle.

11. The adhesive composition of claim 2 wherein the acrylic polymer is a core-shell resin particle.

12. The aqueous emulsion of claim 6 wherein the acrylic polymer is a core-shell resin particle.

13. The adhesive composition of claim 7 wherein the acrylic polymer is a core-shell resin particle.

14. The aqueous emulsion of claim 8 wherein the acrylic polymer is a core-shell resin particle.

15. The adhesive composition of claim 9 wherein the acrylic polymer is a core-shell resin particle.

16. The aqueous emulsion of claim 10 wherein the core-shell resin particle comprises a core comprising an acrylic polymer comprising monomer units derived from alicyclic (meth)acrylate monomers.

* * * * *